M. S. Drake,
Bung,
N⁰ 61,328. Patented Jan. 22, 1867.
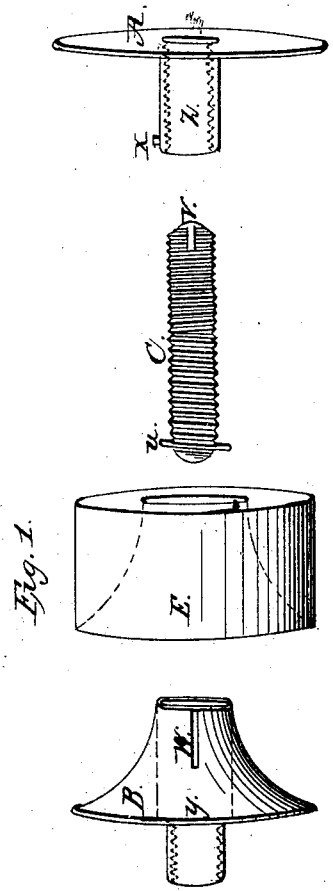
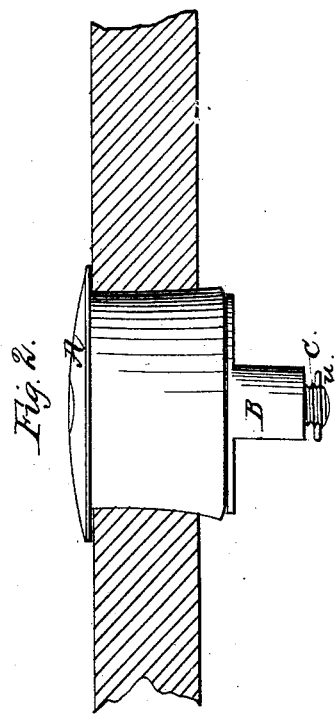
Fig. 1.
Fig. 2.
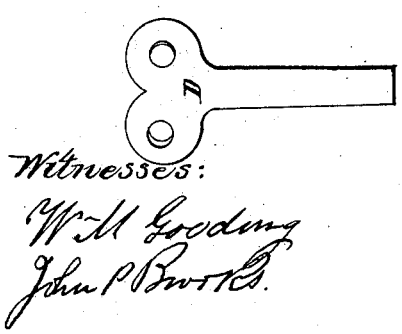
Witnesses:
W M Gooding
John P Burks
Inventor:
Mahlon S Drake

United States Patent Office.

MAHLON S. DRAKE, OF NEWARK, NEW JERSEY.

Letters Patent No. 61,328, dated January 22, 1867.

---

IMPROVED BARREL BUNGS.

---

The Schedule referred to in these Letters Patent and making part of the same.

---

TO ALL WHOM IT MAY CONCERN:

Be it known that I, MAHLON S. DRAKE, of the city of Newark, in the county of Essex, and State of New Jersey, have invented an improvement in Barrel Bungs; and I do hereby declare the following to be a full and exact description of the same, reference being had herein to the drawings that accompany this specification, and which make part of the same.

The nature of my improvement consists in a peculiar provision for expanding the bung after insertion into the bung hole. In the drawings—

Figure 1 shows the various parts of the bung; and

Figure 2, the bung in a barrel stave.

The same letters refer to the same parts in each.

The body of the bung is formed of metal, and is in two parts, A and B; the projection $z$ upon A, fitting and sliding in the hollow $y$, in the part B, being kept from turning therein by the pin $x$, which slides in the groove $w$, in B. A screw with a right and left thread, C, passing through both A and B, in which are corresponding threads, as shown by red lines, upon being turned, moves the two parts to or from each other at one and the same time. The screw C is turned by the insertion of the key D into the slot $v$ in the upper end of the screw and twisting it by hand. A piece of prepared rubber, E, is placed between the two parts A and B. The hole in the rubber, shown by the dotted lines in E, is fitted to the conical-shaped metal bottom-piece B. The key is turned to separate the parts A and B so far as to have no pressure upon the rubber; the bung is then inserted, and upon turning the key the other way so as to draw together the parts A and B, the drawing of the conical end of B into the rubber E expands the rubber and closes the bung hole, both water and air-tight, and it cannot be blown out by effervescence of the contents of the cask. The pin $u$ in the end of the screw C prevents the part B from being let loose from the screw so as to fall into the cask.

I claim as a new article of manufacture a bung for barrels, casks, or cases, constructed substantially as specified.

MAHLON S. DRAKE.

Witnesses:
    W. M. GOODING,
    JOHN P. BROOKS.